(12) United States Patent
Cosentino et al.

(10) Patent No.: US 12,197,401 B2
(45) Date of Patent: Jan. 14, 2025

(54) OBJECT CREATION FROM SCHEMA FOR EVENT STREAMING PLATFORM

(71) Applicant: Red Hat, Inc., Raleigh, NC (US)

(72) Inventors: Andrea Cosentino, Rome (IT); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 246 days.

(21) Appl. No.: 17/328,631

(22) Filed: May 24, 2021

(65) Prior Publication Data

US 2022/0374398 A1 Nov. 24, 2022

(51) Int. Cl.
| | |
|---|---|
| G06F 16/00 | (2019.01) |
| G06F 9/445 | (2018.01) |
| G06F 9/54 | (2006.01) |
| G06F 16/21 | (2019.01) |
| G06F 16/28 | (2019.01) |

(52) U.S. Cl.
CPC ........ *G06F 16/211* (2019.01); *G06F 9/44505* (2013.01); *G06F 9/44521* (2013.01); *G06F 9/542* (2013.01); *G06F 16/289* (2019.01)

(58) Field of Classification Search
None
See application file for complete search history.

(56) References Cited

U.S. PATENT DOCUMENTS

| | | | | |
|---|---|---|---|---|
| 7,899,915 B2 * | 3/2011 | Reisman | ................ | H04H 20/93 |
| | | | | 709/227 |
| 8,732,211 B2 * | 5/2014 | Acuna | ................ | G06F 11/3072 |
| | | | | 707/803 |
| 9,256,646 B2 * | 2/2016 | Deshmukh | ............ | G06F 16/951 |
| 9,858,299 B2 * | 1/2018 | Rashid | ........................ | G06F 8/37 |
| 9,990,187 B1 * | 6/2018 | Carroll | ........................ | G06F 8/30 |
| 9,990,401 B2 * | 6/2018 | Toillion | ................ | G06F 16/25 |
| 10,025,825 B2 * | 7/2018 | Deshmukh | .......... | G06F 16/2455 |
| 10,102,250 B2 * | 10/2018 | Deshmukh | ............ | G06F 16/242 |
| 10,157,213 B1 * | 12/2018 | Ausin | ..................... | H04W 4/38 |
| 10,489,406 B2 * | 11/2019 | Toillion | ............ | G06F 16/24539 |
| 10,592,386 B2 | 3/2020 | Walters et al. | | |
| 10,620,924 B2 | 4/2020 | Stojanovic et al. | | |

(Continued)

FOREIGN PATENT DOCUMENTS

| | | | | | |
|---|---|---|---|---|---|
| CN | 110192380 A | * | 8/2019 | ................ | B60G 9/02 |
| CN | 113190528 B | * | 12/2022 | ............ | G06F 16/211 |

OTHER PUBLICATIONS

Article entitled "Kafka, Streams and Avro serialization" (Year: 2017).*

(Continued)

*Primary Examiner* — Jean M Corrielus
(74) *Attorney, Agent, or Firm* — Womble Bond Dickinson (US) LLP

(57) ABSTRACT

A method includes determining that an application is a consumer of one or more records of an event streaming platform. In response to the application being a consumer of the one or more records, a schema that is associated with the one or more records of the event streaming platform can be determined. The schema can define the data structure of each of the one or more records. The method further includes generating a class that structurally conforms to the schema. During runtime, the object that is instantiated from the class may be used by the application to consume the one or more records.

19 Claims, 6 Drawing Sheets

(56) References Cited

U.S. PATENT DOCUMENTS

| | | | |
|---|---|---|---|
| 10,664,455 B2* | 5/2020 | Oravivattanakul | G06F 16/211 |
| 10,719,552 B2* | 7/2020 | Moraleda | G06V 20/46 |
| 10,789,254 B2* | 9/2020 | Chandramouli | G06F 16/2457 |
| 10,915,507 B1* | 2/2021 | Cheng | G06F 9/45504 |
| 10,997,131 B1* | 5/2021 | Hillyard | G06F 16/289 |
| 11,128,686 B2* | 9/2021 | Mitic | H04L 65/60 |
| 11,537,455 B2* | 12/2022 | Park | G06F 9/542 |
| 11,599,526 B2* | 3/2023 | Thummala Abbigari | G06F 16/2379 |
| 11,683,400 B1* | 6/2023 | Wessendorf | H04L 69/18 709/206 |
| 2011/0264727 A1* | 10/2011 | Keum | H04L 65/80 709/217 |
| 2014/0095483 A1* | 4/2014 | Toillion | G06F 16/25 707/722 |
| 2014/0095529 A1* | 4/2014 | Deshmukh | G06F 16/2477 707/768 |
| 2014/0095535 A1* | 4/2014 | Deshmukh | G06F 16/313 707/769 |
| 2016/0103882 A1* | 4/2016 | Deshmukh | G06F 16/242 707/770 |
| 2016/0219089 A1* | 7/2016 | Murthy | H04L 51/58 |
| 2016/0292591 A1* | 10/2016 | Guirguis | G06N 20/20 |
| 2017/0310628 A1* | 10/2017 | Norwood | H04L 12/1859 |
| 2018/0074870 A1* | 3/2018 | Park | G06F 16/9024 |
| 2018/0075107 A1* | 3/2018 | Park | G06F 16/24532 |
| 2018/0075125 A1* | 3/2018 | Stiel | G06F 16/24532 |
| 2018/0075163 A1* | 3/2018 | Park | G06F 16/248 |
| 2018/0165604 A1 | 6/2018 | Minkin et al. | |
| 2018/0254892 A1* | 9/2018 | Egorov | H04L 9/0891 |
| 2018/0262533 A1* | 9/2018 | McCaig | H04L 63/1441 |
| 2018/0359201 A1* | 12/2018 | Rangasamy | G06F 11/30 |
| 2019/0012249 A1* | 1/2019 | Mercuri | G06F 9/542 |
| 2019/0197418 A1* | 6/2019 | Abutbul | G06F 9/54 |
| 2019/0197419 A1* | 6/2019 | Abutbul | G06F 16/9024 |
| 2019/0258697 A1* | 8/2019 | Wu | G06F 17/18 |
| 2019/0286440 A1* | 9/2019 | Leonard | G06F 8/60 |
| 2019/0342357 A1* | 11/2019 | Mitic | H04L 65/60 |
| 2020/0110602 A1* | 4/2020 | Leonard | G06F 16/2322 |
| 2020/0241942 A1* | 7/2020 | Crouse | G06F 9/546 |
| 2021/0089439 A1* | 3/2021 | Fox | G06F 8/65 |
| 2021/0089440 A1* | 3/2021 | Fox | G06F 21/563 |
| 2021/0141679 A1* | 5/2021 | Li | G06F 9/542 |
| 2021/0144440 A1* | 5/2021 | Li | H04N 21/26208 |
| 2021/0176335 A1* | 6/2021 | Geerinck | G06F 16/24568 |
| 2022/0114483 A1* | 4/2022 | Sabharwal | G06N 20/00 |
| 2022/0171746 A1* | 6/2022 | Guzik | G06F 16/2457 |
| 2022/0172604 A1* | 6/2022 | Guzik | H04L 67/12 |
| 2022/0201054 A1* | 6/2022 | Lee | G06F 9/30003 |
| 2022/0245164 A1* | 8/2022 | Smith | G06F 16/211 |
| 2022/0374398 A1* | 11/2022 | Cosentino | G06F 9/542 |
| 2023/0060957 A1* | 3/2023 | Cosentino | G06F 8/35 |
| 2023/0101004 A1* | 3/2023 | Patel | G06F 16/258 707/610 |

OTHER PUBLICATIONS

Article entitled "Robust Message Serialization in Apache Kafka Using Apache Avro, Part 1" (Year: 2018).*

Article entitled "Spring Cloud Stream Kafka Binder Reference Guide" (Year: 2022).*

"Manage Schemas for Topics," <https://docs.confluent.io/platform/current/control-center/topics/schema.html>, Retrived Mar. 13, 2021, 2 pages.

Azar, Jean-Paul, "Kafka, Avro Serialization, and the Schema Registry," <https://dzone.com/articles/kafka-avro-serialization-and-the-schema-registry>, Sep. 15, 2017, 20 pages.

Baeldung, "Intro to Apache Kafka with Spring," <https://www.baeldung.com/spring-kafka>, Feb. 12, 2021, 13 pages.

DiFelice, Lewis, "A Brief Introduction to Schema Evolution in Kafka Schema Registry," <https://www.instaclustr.com/kafka-schema-registry>, Nov. 5, 2020, 12 pages.

* cited by examiner

OBJECT CREATION FROM SCHEMA FOR EVENT STREAMING PLATFORM

TECHNICAL FIELD

Aspects of the present disclosure relate to event streaming systems, and more particularly, to creation of an object used to consume content from an event streaming system.

BACKGROUND

Event streaming platforms and systems thereof can support the real-time processing of continuous streams of data in motion. Based on events, records can be stored and consumed as these events occur. Events can differ from one application to another. For example, an event can be when a score occurs in a basketball game, or when a trade is made on a public stock exchange, or when a car enters or exits a parking lot. Event streaming technology is available in a variety of formats such as distributed publish-subscribe messaging systems (e.g., the Apache Kafka™ system), distributed real-time computation systems (e.g., the Apache Storm™ system), and streaming data flow engines (e.g., the Apache Flink™ system). Event streaming systems may be implemented in a variety of architectures including a microservices architecture (e.g., the Red Hat™ OpenShift™ platform).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
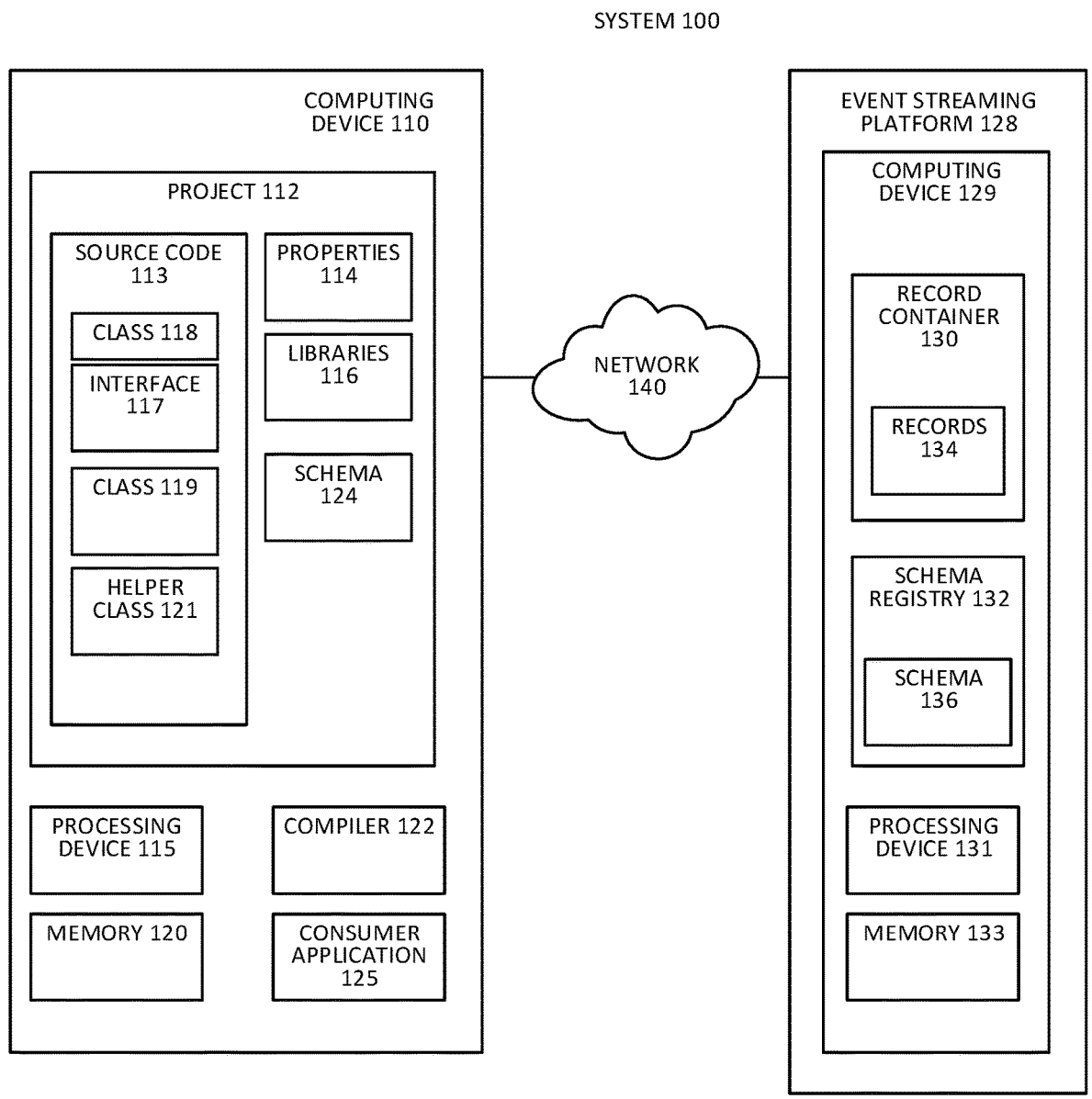
FIG. 1 is a block diagram that illustrates an example system for creating a class from an event streaming schema, in accordance with some embodiments.

In an event streaming platform, one or more producers can produce content based on occurrence of events (e.g., scores in a basketball game, financial transactions, etc.). In response to each event, a producer can store the content as a record (also known as a message) in a record container (e.g., a Kafka topic). One or more consumers can process this content by consuming records from the record container, however, each consumer must know and conform to a schema that is associated with the record in order to consume it. Each record can be a byte array, and the schema defines the structure of the byte array, such as, for example, the order, size, number of, or type of fields in the record, to make sense of the bytes.

In conventional systems, during the development of a client application, in order to produce an application that consumes data from an event streaming platform, the schema that is associated with the records that are to be consumed may need to be manually obtained by the developer. From there, the developer can build a class that will be instantiated as an object such as, for example, a plain old java object (POJO). During runtime, the instantiated object will act as a container for the records that are consumed. If a complex object is required for the record, then a plugin can be used to define the skeleton of the class based on the structure of the record, as defined by the schema. If the schema is known and stored in the developer's consumer project, then the developer can manually write the code for the class based on the schema, or invoke a library to produce a class definition from the schema. If the schema is not known, the developer can pull a record from the platform and use a schema ID in the message to get the schema. The developer can also manually write code (e.g., a helper class) that will, during runtime, deserialize the record and copy the content contained therein to the object. Accordingly, the conventional process of manually coding the class used to contain the content, and the instructions to deserialize the content can be time-consuming and error prone.

Aspects of the disclosure address the above-noted and other deficiencies by automatically gene rating code such as a class that is used during runtime to consume data from an event streaming platform. This can be performed during development of a client application, prior to compiling of the source code, to increase efficiency, reduce error, and allow the developer to direct focus towards application specific functionality. Such features, which can be described as tooling technology, can be performed by running an executable file or a plugin (e.g., a Maven plugin), which can be triggered automatically or by commanded to run by a user. The functionality, which can be performed by processing logic, can be embedded in an integrated development environment (IDE) or standalone.

In one example, processing logic can determine that an application is a consumer of one or more records of an event streaming platform. If the processing logic deems the application to be a consumer of the one or more records, then the processing logic can determine a schema that is associated with the one or more records of the event streaming platform. The schema can define the data structure of each of the one or more records. The processing logic can generate a class that structurally conforms to the schema. This can be performed prior to compiling of the application, e.g., during development. During development, the application includes source code and other supporting features that is organized collectively as a project. The source code of the application can be compiled to produce a machine-executable version of the consumer application. During runtime, the instance object that is instantiated from the class is used by the consumer application to consume the one or more records.

FIG. 1 is a block diagram that illustrates an example system 100 according to some embodiments. As illustrated, the system 100 includes a computing device 110, and an event streaming platform 128 which can be supported by a computing device 129. The computing device 110 and the event streaming platform 128 (and computing devices thereof) may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. Network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may be an L3 network. The network 140 may carry communications (e.g., data, message, packets, frames, etc.) between computing device 110 and computing device 129. Each computing device may include hardware such as processing device 115, 131 (e.g., processors, central processing units (CPUs)), memory 120, 133 (e.g., RAM)), storage devices (e.g., hard-disk drive (HDD), solid-state drive (SSD), etc.—not shown), and other hardware devices (e.g., sound card, video card, etc.—not shown). Memory may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory may be configured for long-term storage of data and may retain data between power on/off cycles of each computing device. Each computing device may comprise any suitable type of computing device or machine that has a programmable processor including, for example, server computers, desktop computers, laptop computers, tablet computers, smartphones, set-top boxes, etc. In some examples, each of the computing devices may comprise a single machine or may include multiple interconnected machines (e.g., multiple servers configured in a cluster). The computing devices may be implemented by a common entity/organization or may be implemented by different entities/organizations. For example, computing device 110 may be operated by a first company/corporation and one or more computing devices 129 may be operated by a second company/corporation. Each of computing device 110 and computing devices 129 may execute or include an operating system (OS) such as host OS. The host OS of a computing device may manage the execution of other components (e.g., software, applications, etc.) and/or may manage access to the hardware (e.g., processors, memory, storage devices etc.) of the computing device.

In one example, a project 112, which is a pre-compiled version of the application, resides on the computing device and includes one or more files that house source code 113. Source code 113 includes a plurality of software instructions that can be compiled by a compiler 122 to form an executable consumer application 125. A developer can write the code using a simple word processing tool or a more sophisticated tool such as an IDE. In one example, the project can include one or more classes 118 or interfaces 117 that serve as blueprints for objects that are instantiated during runtime of an application. An interface may be an abstract type that is used to specify a behavior that a class must implement. The source code can utilize one or more libraries 116 that have additional source code and functionality that can be referenced and called upon by the source code 113.

In one example, if the processing device 115 determines that the application is to consume a record 134 from the record container 130 of the event streaming platform, then the processing device can generate a class 119, which is a container class, that has a structure that conforms to the structure of the record 134 (e.g., the serialization format, type, size, name, and/or number of fields in the record). The structure of the record 134 can be defined by schema 136, which can be managed by a schema registry 132.

A schema registry can support multiple serialization formats. For example, Apache Avro is a data serialization framework. It uses JSON for defining data types and protocols. Protocol Buffers (Protobuf) is a method of serializing structured data. It uses an Interface Description Language (IDL) to describe the data structure. JSON Schema is a method that describes and validates JSON documents. A schema registry can store and support multiple formats at the same time.

In one example, the processing device can search the project (e.g., the source code 113 and/or properties 114) to determine whether or not the application is a consumer of records 134. The processing device can obtain a schema 136 from the registry 132 and copy it locally as schema 124. The processing device can generate class 119 (e.g., a container class) in view of the schema 124, so that the class has properties that are compatible with the records 134. As such, when an instance is instantiated using the class 119, it may act as a container for a record that is consumed by the consumer application. Further, the processing device can generate a helper class 121 in view of the schema 124. The helper class 121 can contain instructions to populate information from the one or more records 134 to an instantiation of the class 119 during runtime. As such, development of consumer applications in an event streaming environment can be streamlined.

Figure 2:
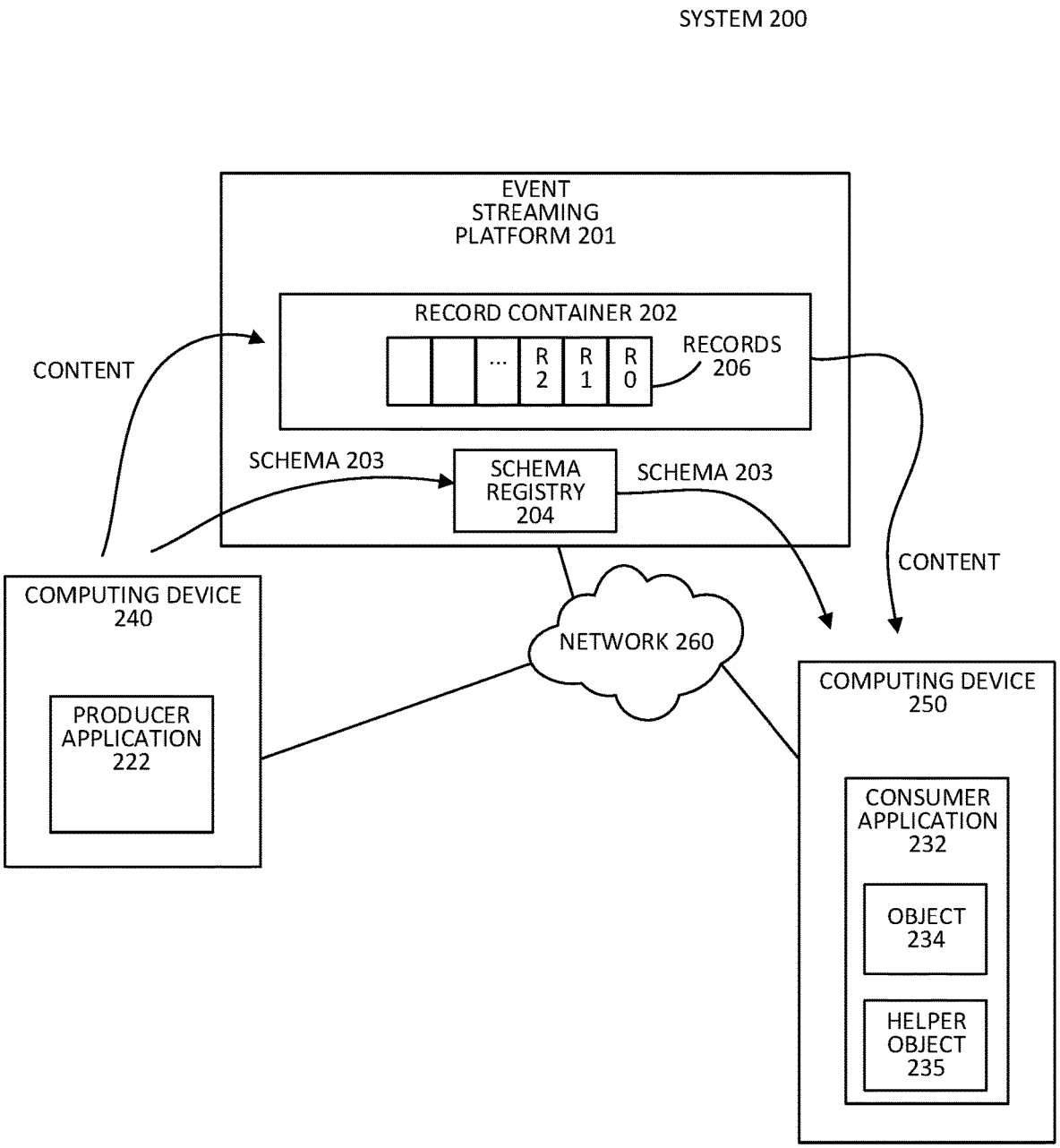
FIG. 2 shows an example event streaming system for receiving and providing content, in accordance with some embodiments.

FIG. 2 shows an example event streaming system 200. An event streaming platform 201 can have a record container 202, such as a Kafka topic. The record container 202 can store one or more records 206. Each record 206 can be a discrete data structure (e.g., a byte stream) that stores content. The content can be stored sequentially to each record 206 in the record container 202 by a producer application 222. The producer application 222, which can reside on a computing device 240 can monitor the occurrence of one or more events, and store content to a record 206 when the one or more events occur (e.g., a financial transaction, a score in a basketball game, a vehicle entering or exiting a parking lot, etc.). These records 206 can be stored sequentially in the record container 202 based on the order in which the content was produced and stored to each record. For example, R0 contains content relating to a first event. R1 contains content relating to a second event that occurred after the first event, and so on.

A consumer application 232, which can reside on computing device 250, can consume the one or more records 206 from the event streaming platform 201. To consume a record, a helper object 235 may populate information from the record to the object 234 in a process referred to herein as deserialization. Deserialization may be the process where a byte stream (e.g., the record) is unpacked into a format of the object 234 (e.g., object properties). The object 234 and the record can each have a structure that is defined by a schema 203. The schema 203 can include the schema format (e.g., Avro, Protobuf, JSON Schema) as well as the fields and order of the fields of each record 206. The schema registry 204 can define a scope in which schemas can evolve. The content is thus formatted and accessible to the rest of the consumer application 232 in the form of the object 234. Each record 206 can include a unique schema ID which can then be used by the consumer application 232 to obtain the schema 203 that is associated with the ID from the schema registry 204. The computing device 240, computing device 250, and the event streaming platform 201 (and computing devices thereof) may be coupled to each other (e.g., may be operatively coupled, communicatively coupled, may communicate data/messages with each other) via network 260, which can include technology such as that which is described with respect to network 140.

The consumer application 232 can consume a record in order (e.g., R0 first), or out of order (e.g., using an offset to R0). The consumer application 232 can consume a record periodically and this period can vary based on application. The consumer application 232 can process the content in numerous ways, depending on application. For example, the content can be merged with other content, stored to one or more databases, shown on a display, used to perform an action, etc. The source code for object 234 and the helper object 235 can be automatically generated by a processing device during development (e.g., prior to compiling) which can reduce the time taken to develop the application. The event streaming platform 201 can clear records after a certain time has passed, or based on other criteria, as defined by one or more policies.

The record container 202 can be a Kafka topic. In a Kafka topic, each record 206 can include a key-value pair. Either the record key or the record value, or both, can be serialized (e.g., as Avro, JSON, or Protobuf format). The record container 202 can be treated as a category or feed name to which records are stored and published. All records 206 can be organized into respective record container 202. One or more producer applications 222 can write data to a topic. Similarly, one or more consumer applications such as consumer application 232 can read from the record container 202. Some applications can write to a record container and read to the same or a different record container. Thus, an application can be both a consumer and producer.

Figure 3:
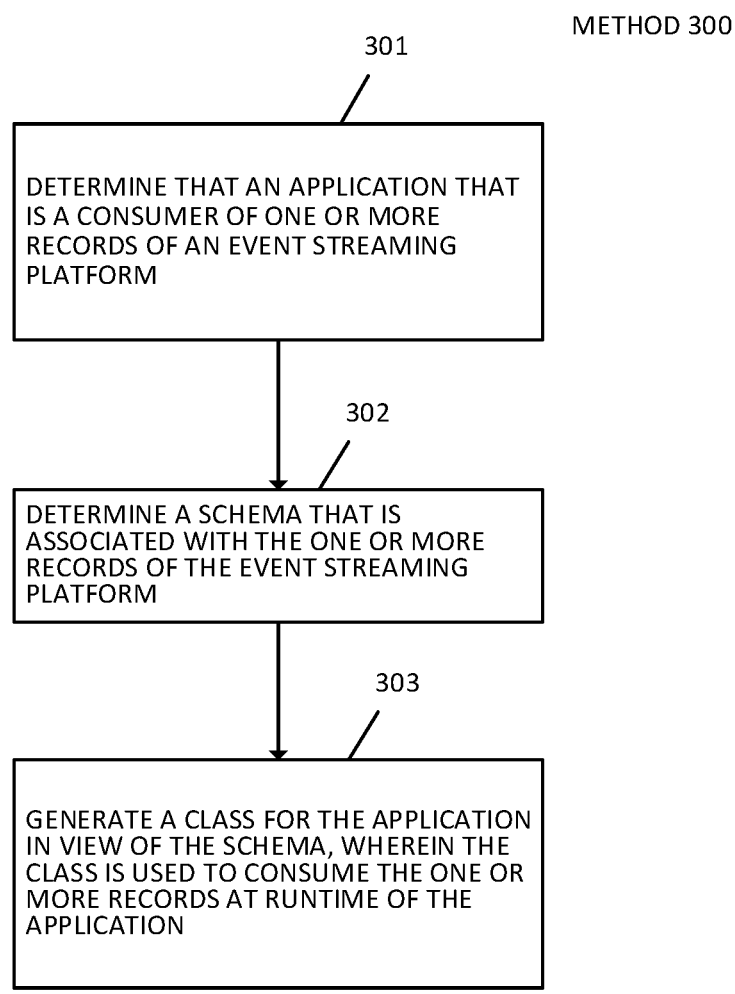
FIG. 3 shows an example method for creating a class automatically, in accordance with some embodiments.

FIG. 3 is a flow diagram of a method 300 for creating a class automatically, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

At block 301, processing logic may determine that an application is a consumer of one or more records of an event streaming platform. For example, processing logic can search the pre-compiled application, which can be a project that includes software instructions, to determine whether the application is a consumer of one or more records of an event streaming platform. In some examples, processing logic can search the application to detect the presence of a specific class, a specific interface, a specific library, or specific input parameters that are associated with the event streaming platform.

Regarding searching by class or interface, for example, processing logic can search the classes 118 and/or interfaces 117 of project 112 in FIG. 1 to detect whether one or more known Kafka packages are imported, whether a Kafka 'Consumer' class or package is implemented, and/or whether the code contains a reference to a 'Record' class.

For example, processing logic can detect the presence of a specific library by analyzing dependencies, for example, a Project Object Model (POM) file, 'build.gradle' file or 'ant' file, to determine if the project relates to an event streaming platform (e.g., Kafka). The dependencies portion of the file can be parsed to detect presence of 'Kafka-client', 'kafka_2.1', or other artifacts relating to Kafka or another event streaming platform.

Regarding searching specific input parameters, processing logic can search the properties of the project to detect presence of specific key names in the properties. For example, properties may be stored in a configuration or property file associated with the project (e.g., an 'application.properties' file). Processing logic can search the properties to detect presence of event streaming related properties like key.converter, value.converter, value.serializers, etc. Processing logic can obtain an event streaming configuration master list and compare this with the properties to see if the properties of the project are configured to be directed towards event streaming (e.g., as a consumer or producer).

Additionally, or alternatively, processing logic can search the application to detect presence of a poll function that consumes the one or more records. A project can use an API method that invokes a poll( ) command to consume a record. This poll( ) command (e.g., poll(duration)) polls the event streaming platform at the specified period (e.g., every 10 seconds, 60 seconds, etc.) and fetches a record from the event streaming platform. Thus, the processing logic can use the poll( ) command as an indicator that the application is a consumer of records.

At block 302, in response to determining that the application is a consumer of the one or more records of the event streaming platform, processing logic may determine a schema that is associated with the one or more records of the event streaming platform. For example, processing logic can make a connection to a schema registry based on a network address such as a schema registry URL that processing logic detects in the software instructions of the application or in the configuration data (e.g., an 'application.properties' file) that is associated with the application. Processing logic can obtain a name of the record container (e.g., a topic name) that the application is to consume from, by searching the configuration information (e.g., the 'application.properties' file) or by searching the application code for a hardcoded name. Processing logic can search the schema registry to determine if there is a schema that is associated with the name of the record container. If there is a schema that is associated with the name (e.g., a Kafka topic name), then this schema can be obtained, by the processing logic, from the schema registry.

Additionally, or alternatively, processing logic can determine the schema by instantiating a client application (e.g., a Kafka client) that reads the one or more records of the event streaming platform to extract the schema. Each record includes a schema ID that can be used by processing logic to look up and obtain the schema from the schema registry. In some embodiments, processing logic can obtain the schema in this manner as a backup, for example, if the schema could not be obtained by looking up the schema registry using the obtained name of the record container as described in other sections.

At block 304, the processing logic may generate a class for the application in view of the schema. The class is used to consume the one or more records at runtime of the application. The class can be stored in memory as part of, or in association with, the project. The class can be re-used by the project. The class, which can be described as a container class, can include getter and setter functions for properties (e.g., fields) that are present in the records and defined by the schema. For example, if a record contains a 'name' and 'cost', then the class can be generated to include a 'name' property and 'cost' property with respective getter and setter functions.

During runtime, an object instance of the container class is instantiated and used to fetch content from the records. The class can define a plain old java object (POJO). For POJOs, the class is public, properties which are variables, are private, the class must have a default constructor, it can have an additional constructor with arguments, and every property has public getter and setter method.

As discussed, at block 304, processing logic can also generate a helper class in view of the schema, that contains instructions to populate information from the one or more records to the object instance of the container class. An instance of the helper can, during runtime, use the schema to determine each field name (e.g., a key) of a record, and obtain the value associated with each field of the record using the respective key. The helper instance can convert the value to a correct type (e.g., as defined by the schema) and set the value in the respective property in the object instance of the class that structurally conforms to the schema.

The method 300 can be performed automatically, such as by a processor, without requiring human input. The method can be performed on the pre-compiled version of the application (e.g., during development), to generate a class used by the compiled application for consuming a record. As such, the method can reduce the development time and risk of error when developing a consumer application, thereby simplifying workflow for the developer. Further, since schema can be modified over time, the method can be performed to simplify updates to consumer applications. The processing logic can do so by detecting if an application is a consumer of an event streaming platform, and automatically obtain schema from registry or from a record, as described. Processing logic can auto-generate code such as the container class onto which the record is deserialized to, as well as the helper class that performs deserialization, is also auto-generated. Further, processing logic leverage string manipulation libraries that provide functionality to read text in files (e.g., for searching) and write text to files (e.g., for generating classes), to search the application settings and code.

Figure 4:
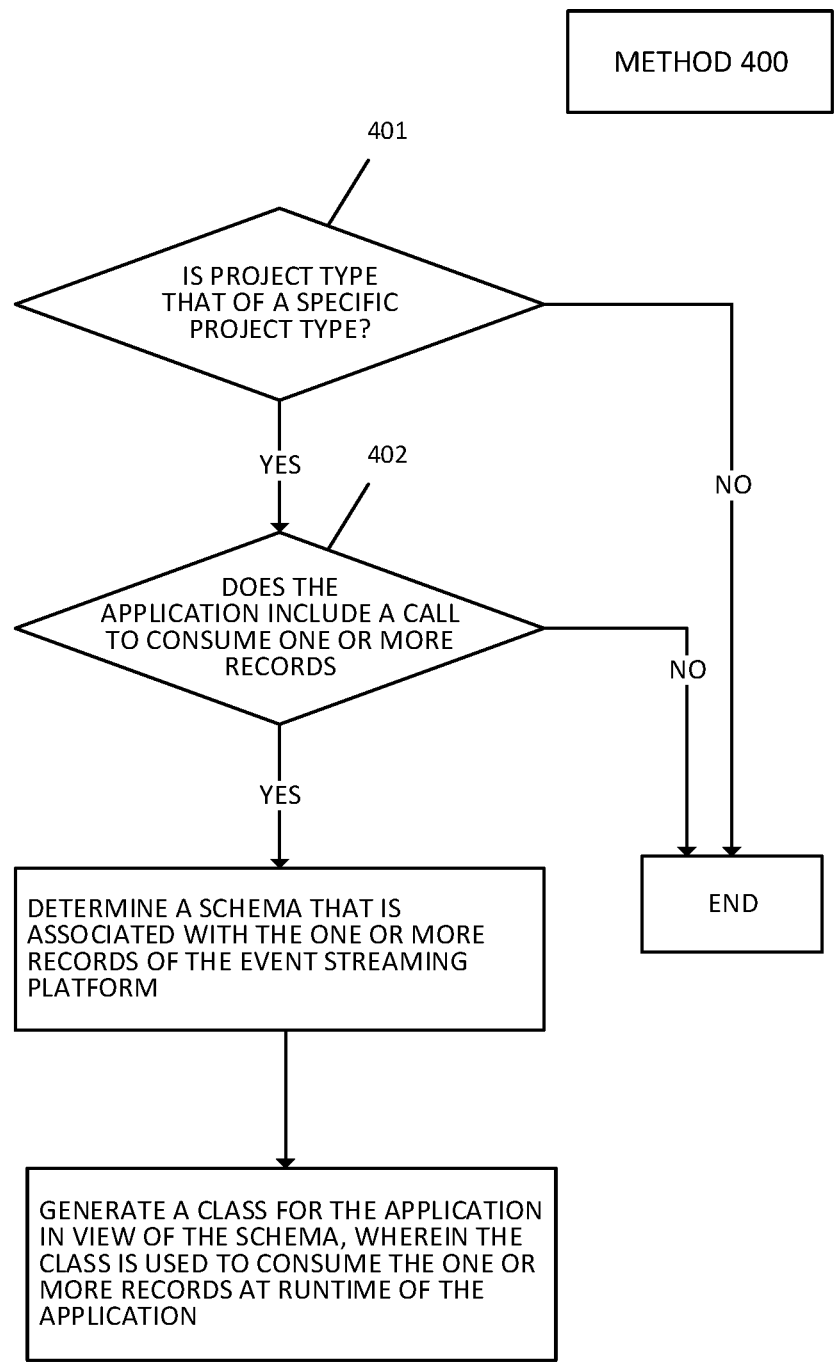
FIG. 4 shows an example method for automatically creating a class in an incremental manner, in accordance with some embodiments.

FIG. 4 is a flow diagram of a method 400 for creating a class automatically, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

The method 400 is similar to the method 300, however, determining that the application is a record consumer (operation 301 of FIG. 3) can be separated into blocks 401 and 402. At block 402, processing logic can determine whether a project type of the application is a specific project type that is associated with an event streaming platform (e.g., a Kafka project). For example, processing logic can search the application to detect presence of a specific class, a specific interface, a specific library, or specific input parameters that are associated with an event streaming platform, as described in other sections. If at least one of those indicators are detected, then processing logic can proceed to block 402. Otherwise, processing logic may halt performance of the method.

At block 402, processing logic can search the application to detect whether it includes a call to consume one or more records, such as an API call that invokes the poll command. If so, then the application can be assumed to be a consumer. Being that the application is a consumer, processing logic can continue to the remaining blocks, such as those discussed with regard to FIG. 3, to automatically obtain a schema that is associated with the one or more records and generate one or more consumer-related classes based on the schema.

If, however, the application does not include a call to consume the one or more records, processing logic may halt performance of the method. In some examples, blocks 401 and 402 can be performed in the sequential manner shown, thereby reducing overhead by determining step-by-step whether or not to continue performing the method.

Figure 5:
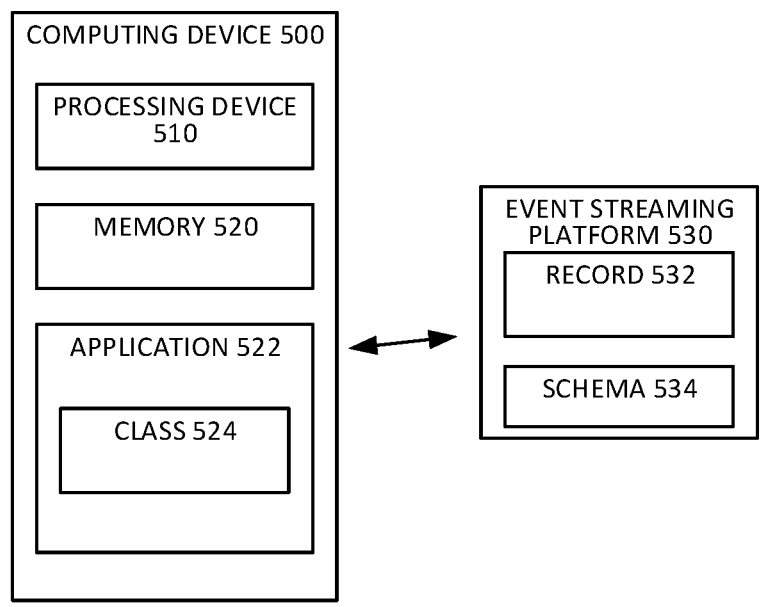
FIG. 5 is a block diagram illustrating a computing device for creating a class automatically, in accordance with some embodiments.

FIG. 5 is a block diagram illustrating a computing device 500 for creating a class automatically, according to some embodiments. Computing device 500 includes a processing device 510 and a memory 520. Memory 520 may include volatile memory devices (e.g., random access memory (RAM)), non-volatile memory devices (e.g., flash memory) and/or other types of memory devices.

Processing device 510 may determine that an application 522 is a consumer of one or more records 532 of an event streaming platform 530. In response to determining that the application is a consumer of the one or more records 532, the processing device 510 can determine a schema 534 that is associated with the one or more records 532 of the event streaming platform 530. Application 522 can be an uncompiled application such as a project that organizes source code, settings, libraries, etc. The processing device 510 may generate a class 524 for the application 522 in view of the schema 534. The class 524 is used by the application 522 at runtime to consume the one or more records 532 at runtime of the application 522.

Figure 6:
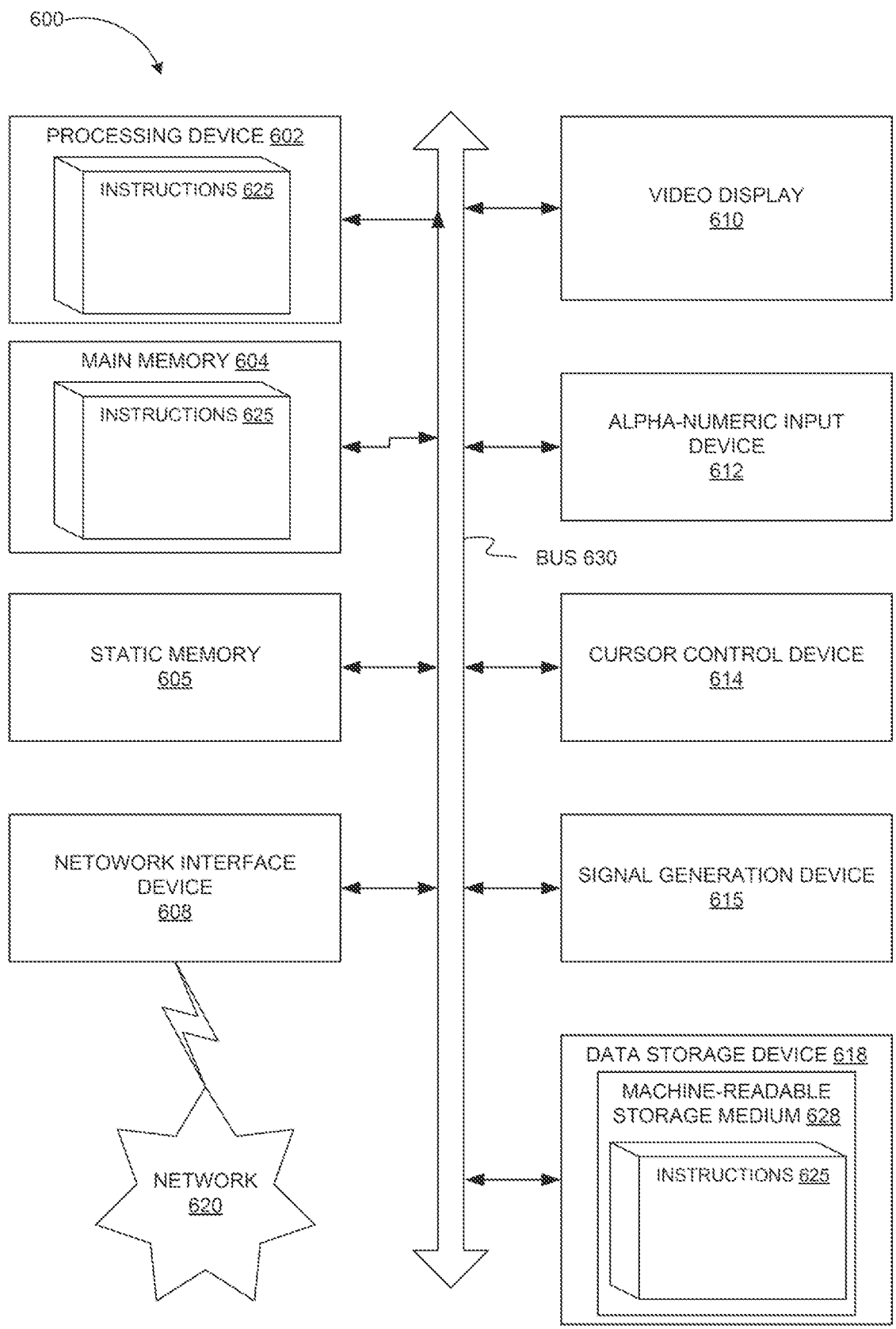
FIG. 6 is a block diagram of an example computing device that may perform one or more of the operations described herein, in accordance with some embodiments.

FIG. 6 is a block diagram of an example computing device 600 that may perform one or more of the operations described herein, in accordance with some embodiments. For example, the computing device can be used to develop a consumer application for an event streaming platform, or to host a client application that consumes from the event streaming platform.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 605 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a processing device (e.g., processing device 115 or 510), for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    determining, by a processing device, that an application is a consumer of one or more records of an event streaming platform including searching generated pre-compiled source code of the application to determine that the application is the consumer of the one or more records of the event streaming platform;
    in response to determining that the application is the consumer of the one or more records of the event streaming platform:
    determining, by the processing device, a schema that is associated with the one or more records of the event streaming platform, including:
        instantiating and running a client application,
        receiving by the client application, over a computer network, the one or more records from the event streaming platform, and
        obtaining the schema from a schema registry based on a schema ID that is included in the one or more records;
    generating, by the processing device, additional pre-compiled source code of a class for the application in view of the schema including generating a function that is associated with a property of a plain old java object (POJO), as defined by the schema; and
    consuming the one or more records from the event streaming platform with the application that is compiled.

2. The method of claim 1, wherein the event streaming platform includes a Kafka topic that comprises the one or more records.

3. The method of claim 1, further comprising generating a helper class used to populate information from the one or more records to an instance of the class.

4. The method of claim 1, wherein determining that the application is the consumer of the one or more records comprises:
    searching the generated pre-compiled source code of the application to find at least one of a specific class, a specific interface, a specific library, or specific input parameters that is associated with the event streaming platform.

5. The method of claim 1, wherein determining that the application is the consumer of the one or more records comprises: searching the generated pre-compiled source code of the application to find that the application comprises a call to a poll function that consumes the one or more records.

6. The method of claim 1, wherein determining the schema of the one or more records comprises connecting to the schema registry based on a network address in the application or configuration data associated with the application.

7. The method of claim 1, wherein generating the function includes generating the class with getter and setter properties as defined by the schema.

8. A system comprising:
    a memory; and
    a processing device operatively coupled to the memory, the processing device to:
        determine that an application is a consumer of one or more records of an event streaming platform including searching generated pre-compiled source code of the application to determine that the application is the consumer of the one or more records of the event streaming platform;
        in response to determining that the application is the consumer of the one or more records of the event streaming platform:
        determine a schema that is associated with the one or more records of the event streaming platform, including to
            instantiate and run a client application,
            receive by the client application, over a computer network, the one or more records from the event streaming platform, and
            obtain the schema from a schema registry based on a schema ID that is included in the one or more records;
        generate additional pre-compiled source code of a class for the application in view of the schema, including generating a function that is associated with a property of a plain old java object (POJO), as defined by the schema; and
        consume the one or more records from the event streaming platform with the application that is compiled.

9. The system of claim 8, wherein the event streaming platform includes a Kafka topic that comprises the one or more records.

10. The system of claim 8, wherein the processing device is further to generate a helper class that is used to populate information from the one or more records to an instance of the class.

11. The system of claim 8, wherein to determine that the application is the consumer of the one or more records, the processing device is to: search the generated pre-compiled source code of the application to find at least one of a specific class, a specific interface, a specific library, or specific input parameters that is associated with the event streaming platform.

12. The system of claim 8, wherein to determine that the application is the consumer of the one or more records comprises, the processing device is to: search the generated pre-compiled source code of the application to find that the application comprises a call to a poll function that consumes the one or more records.

13. The system of claim 8, wherein to determine the schema of the one or more records, the processing device is to: connect to the schema registry based on a network address in the application or configuration data associated with the application.

14. A non-transitory computer-readable storage medium including instructions that, when executed by a processing device, cause the processing device to:
determine, by the processing device, that an application is a consumer of one or more records of an event streaming platform including searching generated pre-compiled source code of the application to determine that the application is the consumer of the one or more records of the event streaming platform;
in response to determining that the application is the consumer of the one or more records of the event streaming platform:
determine, by the processing device, a schema that is associated with the one or more records of the event streaming platform, including to:
instantiate and run a client application,
receive by the client application, over a computer network, the one or more records from the event streaming platform, and
obtain the schema from a schema registry based on a schema ID that is included in the one or more records;
generate, by the processing device, additional pre-compiled source code of a class for the application in view of the schema including generating a function that is associated with a property of a plain old java object (POJO), as defined by the schema; and
consume the one or more records from the event streaming platform with the application that is compiled.

15. The non-transitory computer-readable storage medium of claim 14, wherein the event streaming platform includes a Kafka topic that comprises the one or more records.

16. The non-transitory computer-readable storage medium of claim 14, wherein the processing device is further to generate a helper class that is used to populate information from the one or more records to an instance of the class.

17. The non-transitory computer-readable storage medium of claim 14, wherein to determine that the application is the consumer of the one or more records, the processing device is to: search the generated pre-compiled source code of the application to find at least one of a specific class, a specific interface, a specific library, or specific input parameters that is associated with the event streaming platform.

18. The non-transitory computer-readable storage medium of claim 14, wherein to determine that the application is the consumer of the one or more records comprises, the processing device is to: search the generated pre-compiled source code of the application to find that the application comprises a call to a poll function that consumes the one or more records.

19. The non-transitory computer-readable storage medium of claim 14, wherein to determine the schema of the one or more records, the processing device is to: connect to the schema registry based on a network address in the application or configuration data associated with the application.

* * * * *